US006422806B1

(12) United States Patent
Jenkins et al.

(10) Patent No.: US 6,422,806 B1
(45) Date of Patent: Jul. 23, 2002

(54) PALLET STACKER SYSTEM

(75) Inventors: Gary E. Jenkins, Mason; Gregory W. Reichling, Cincinnati, both of OH (US)

(73) Assignee: Kolinahr Systems, Inc., Cincinnati, OH (US)

( * ) Notice: Subject to any disclaimer, the term of this patent is extended or adjusted under 35 U.S.C. 154(b) by 0 days.

(21) Appl. No.: 09/537,224

(22) Filed: Mar. 28, 2000

(51) Int. Cl.$^7$ .............................................. B65H 29/00

(52) U.S. Cl. ............................... 414/795.2; 414/795.3; 414/794.9

(58) Field of Search ........................... 414/795.2, 795.3, 414/794.9

(56) References Cited

U.S. PATENT DOCUMENTS

| | | | | |
|---|---|---|---|---|
| 3,765,546 A | * | 10/1973 | Westerling | 414/795.2 |
| 4,212,579 A | * | 7/1980 | Stromberg | 414/795.2 |
| 4,273,488 A | * | 6/1981 | Hill et al. | 414/795.2 |
| 4,632,620 A | * | 12/1986 | Wiggers | 414/795.2 |

OTHER PUBLICATIONS

Newcastle Company, Inc., *Newcastle Load Stacking Systems*, Brochure (Stacker-F099).

* cited by examiner

*Primary Examiner*—Christopher P. Ellis
*Assistant Examiner*—Mark A. Deuble
(74) *Attorney, Agent, or Firm*—Wood, Herron & Evans, L.L.P.

(57) ABSTRACT

A method and apparatus for stacking first and second loaded pallets includes a pallet stacker that defines a stationary stacking location. A first loaded pallet is conveyed to the stationary stacking location. In preferred form, plural sensors check the first loaded pallet for preferred load height and preferred load integrity. A pallet carriage vertically adjustable at the stationary stacking location then engages the first loaded pallet and moves it to a temporary holding position. A second loaded pallet is conveyed into vertical registration with the first loaded pallet. The plural sensors also check the second loaded pallet for preferred load height and preferred load integrity. The first loaded pallet is then vertically adjusted into stable stacked relation with the second loaded pallet, and the pallet carriage disengages the first loaded pallet. The first and second loaded pallets, in stable stacked relation to each other, thereafter are discharged from the stationary stacking location.

26 Claims, 11 Drawing Sheets

PALLET STACKER SYSTEM

This invention relates to loaded pallets. More specifically, this invention relates to an improved system for stacking loaded pallets one on top of the other.

Pallets, e.g., wood pallets, are used to store and transport loads of a vast range of goods. For example, a pallet can be used to transport boxes of goods that have been stacked and shrink-wrapped or otherwise secured upon the pallet from a manufacturer to a point of sale. Of course, a pallet carrying a full load can be very large and heavy and, therefore, difficult, dangerous and time consuming to move within a warehouse, for example. And oft times two loaded pallets are stacked one on top of the other for handling time and/or storage efficiency reasons.

One type of known pallet moving and stacking system simply employs a first forklift truck to move a first loaded pallet to a stacking location, whereat either the first forklift truck must retrieve a second loaded pallet to stack upon the first loaded pallet, or a second forklift truck is employed to stack the second loaded pallet upon the first loaded pallet. Then, a forklift truck must lift the first and second stacked and loaded pallets from the stacking area and move them to a storage location. This system for moving and stacking pallets is time consuming and can be dangerous. Using a first forklift truck with or without a second forklift truck helping stack loaded pallets requires the time and attention of at least one employee, and is relatively slow. Because using forklifts requires at least one forklift operator, moving and stacking pallets by this system also is prone to human error. For example, an operator could have an accident, toppling an upper loaded pallet from a lower loaded pallet on the forklift, and possibly endangering other employees.

Automated pallet moving and stacking systems are also known in the prior art. In a first type of stacking system, a vertically adjustable fork travels generally horizontally back and forth perpendicular to a conveyor. The fork picks up a first loaded pallet provided on the conveyor, and elevates that pallet above the conveyor. A second loaded pallet is conveyed into position under the elevated first pallet which is then set down upon the second loaded pallet. This system has a large operating footprint. That is, the conveyor and traveling fork system takes up a significant space within a warehouse, along a loading dock, or other location having a large enough floor space which could otherwise be used more efficiently.

In a second known automated pallet stacking system, a conveyor transports a first loaded pallet to a scissors-lift table. The scissors-lift table lifts the first loaded pallet and, in the lifted position, a fork engages the pallet. The scissors-lift table then retracts back to the level of the conveyor. A second loaded pallet is then conveyed to the scissors-lift table. The scissors-lift table raises the second loaded pallet into engagement with the first loaded pallet held by the retractable fork. The fork then retracts from engagement with the first loaded pallet, the scissors-lift table is lowered, and the first and second loaded pallets are thereafter moved away from the scissors-lift table to a desired location. In order to use a scissors-lift table system, an existing conveyor system must be retrofitted to accommodate the scissors-lift table itself. And this system also uses significant floor space because of the retractable fork.

In the above mentioned automated systems which are hydraulic powered, maintenance is time consuming, difficult and messy when dealing with hydraulic fluids. Also, the hydraulic systems are expensive to maintain and require compliance with environmental regulations regarding hydraulic fluid disposal.

It is therefore an objective of the present invention to provide an improved stacking system for loaded pallets whereby the efficiency of stacking loaded pallets is enhanced over prior art systems.

It is a further objective of the present invention to provide an improved system for stacking loaded pallets which occupies less space, i.e., has a smaller floor footprint, than prior art pallet stacking systems.

It is another objective of the present invention to provide an improved stacking system for loaded pallets in which cost and frequency of maintenance is reduced relative to prior art systems.

It is another objective of the present invention to provide an improved system for stacking loaded pallets in which the stacked pallets' stability characteristics are sensed prior to being stacked one on top of the other.

SUMMARY OF THE INVENTION

The objectives of the present invention are realized with a modular pallet stacker for stacking loaded pallets one on top another in which a first loaded pallet is stacked upon a second loaded pallet within a stationary frame defining a stationary work station with a vertically adjustable pallet carriage in operational engagement with the work station. The pallet carriage engages the first loaded pallet at an entry position in the work station, and vertically adjusts the first loaded pallet to a temporary holding position within the work station, which holding position is at a vertical location different from the entry position of the first loaded pallet. The work station then receives a second loaded pallet at the entry position in vertical registration with the first loaded pallet held in the temporary holding position. The pallet carriage is then vertically adjusted until the first loaded pallet is received in stacked relation with the second loaded pallet.

The pallet stacker advantageously uses a series of height and load sensors to ensure that the first and second loaded pallets have the desired stability characteristics prior to being stacked one on top of the other. In particular, a first height sensor checks the height of each of the first and second loaded pallets as each is advanced by a conveyor into the work station. First and second load sensors check that each of the first and second loaded pallets has a preferred load characteristic to ensure that a full load has been previously automatically loaded on each pallet. A second height sensor senses when the first loaded pallet is successfully stacked on the second loaded pallet. This allows the conveyor upon which the first and second stacked pallets rest to transport the stacked pallets away from the work station.

The system also preferably includes an alignment stop engaged by the leading edge of the first and second loaded pallets as each is successively transported by the conveyor into the work station. Each loaded pallet is properly registered or aligned within the work station against the stop because it is pushed against the stop by the conveyor. A stop sensor connected with the conveyor acts to stop the sensor after a time delay sufficient to allow alignment of the loaded pallet in the work station. A carriage grip completion switch and a carriage disengagement switch are also preferably provided on the pallet carriage in order to, respectively, arrest engagement of the pallet carriage with the first pallet and arrest movement of the pallet carriage when the first loaded pallet is stacked upon the second loaded pallet.

A method in accord with this invention for automatically stacking first and second loaded pallets, one on top of the other, is provided by locating a first loaded pallet in an entry position at a stationary work station where a vertically adjustable pallet carriage engages the first loaded pallet and vertically adjusts the first loaded pallet to a height exceeding the first loaded pallet's height to a temporary holding position above the entry position in the stationary work station. Thereafter, a second loaded pallet is located in the entry position of the stationary work station and the first loaded pallet is moved in a reverse direction downwardly from its temporary holding position into stacked relation with the second loaded pallet. By moving the first loaded pallet in a vertical direction above the entry position of the stationary work station to the temporary holding position and, thereafter, positioning the second loaded pallet in the entry position of the stationary work station to receive the first loaded pallet thereon, the present invention provides a method for stacking loaded pallets which occupies a relatively small floor space footprint when compared to prior art pallet stacking methods. The present inventive method may be employed with an existing conveyor system rather than prior art pallet stacking methods which may require substantial modification to existing conveyor systems.

The features and objectives of the present inventive pallet stacking system will become more readily apparent from the following Detailed Description taken in conjunction with the accompanying drawings.

DETAILED DESCRIPTION

Figure 1:
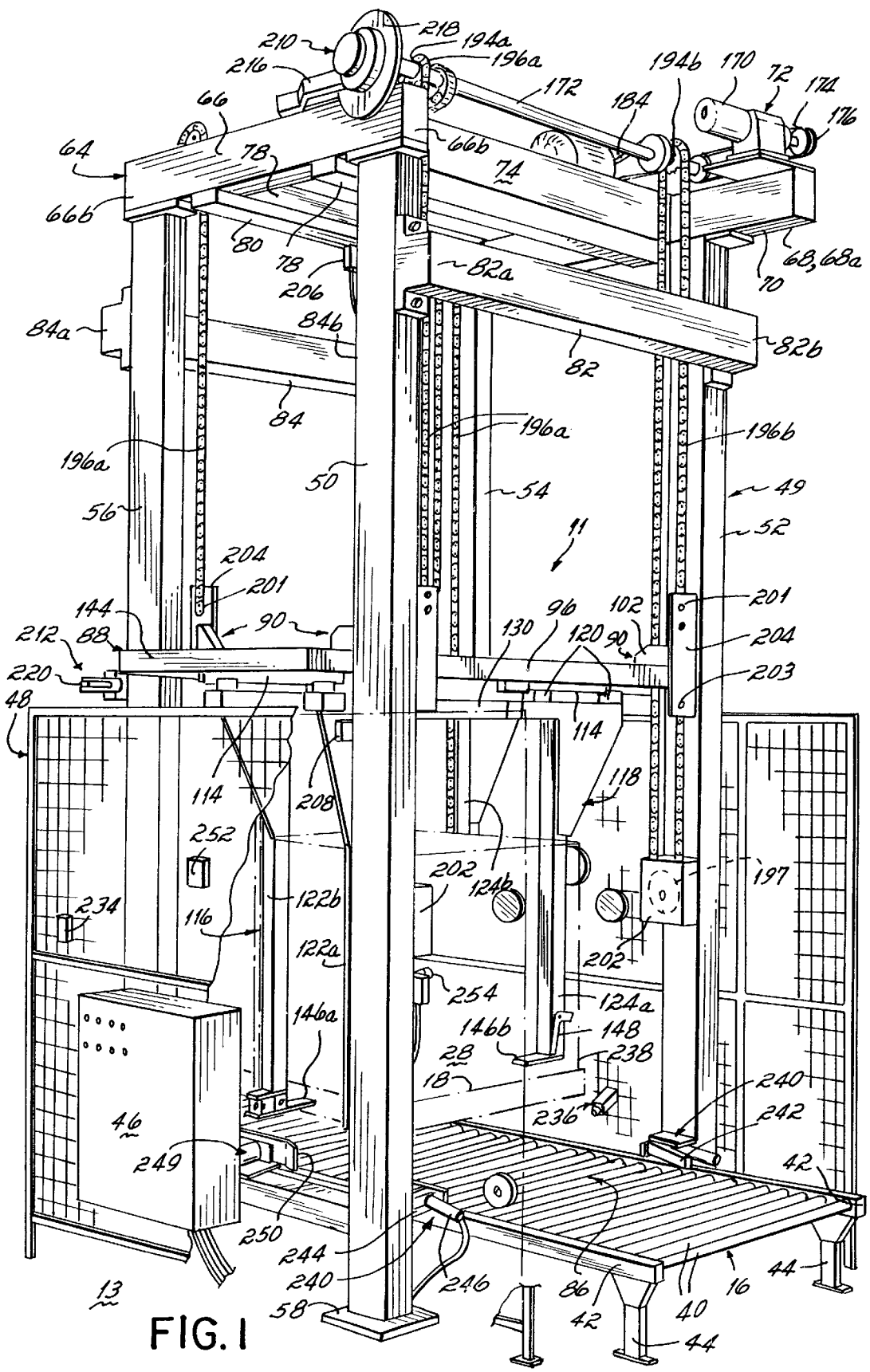
FIG. 1 is a perspective view partially broken away of a pallet stacker in accordance with principles of the present invention.
Figure 2:
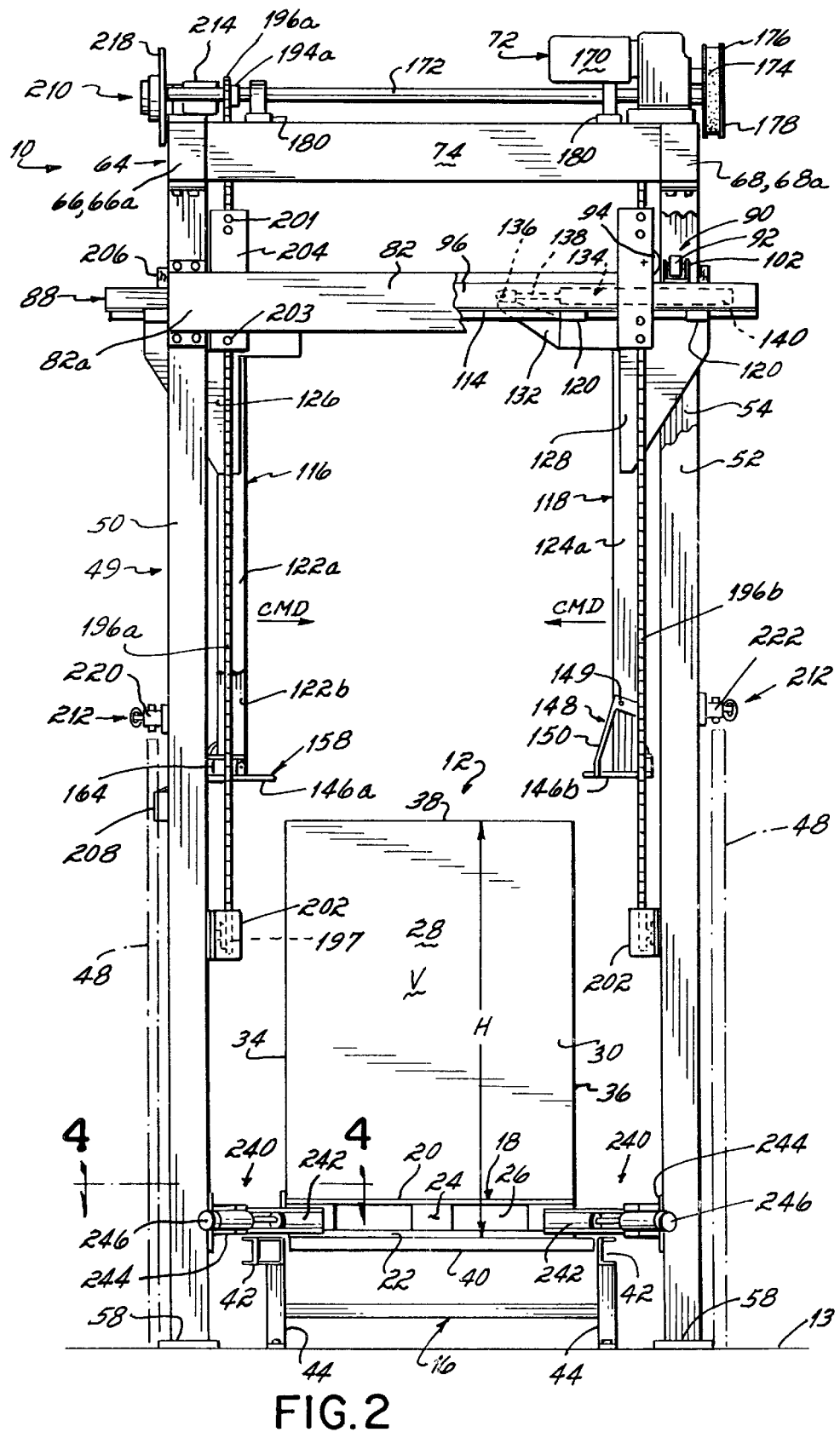
FIG. 2 is a front plan view of the stacker of FIG. 1.

In accordance with the principles of the present invention, a modular pallet stacker 10 is provided that is adapted to stack loaded pallets 12 carried to the pallet stacker 10 by a conventional conveyor system 16, the stacker defining a stationary work station 11 relative to floor 13, see FIGS. 1 and 2. A typical pallet 18 known in the art generally includes a planar top member 20 and a planar base member 22 spaced from each other by blocks 24 which define a gap 26 between the top member 20 and bottom member 22, see FIGS. 6, 7 and 9A. Prior to being transported to the pallet stacker 10, a pallet 18 receives a load 28, for example, plural boxes, from a pallet loader (not shown). It is the objective of the automatic pallet loader to stack a load 28 on each pallet 18 having a preferred load height H and a preferred load integrity V. The preferred load integrity V is defined for the purposes of this disclosure as a load 28 with substantially vertical and complete opposing front 30 and rear 32 surfaces, opposing side surfaces 34, 36 and a substantially horizontal top surface 38. In other words, a pallet 18 with a load 28 having a preferred load integrity V means a load that is stacked on the pallet in such a fashion as to be able to support a second upper pallet (with a second load) on the top surface 38 of the load of a first lower pallet without the upper loaded pallet causing a potential tipping or falling, i.e., safety, problem after it has been stacked on top of the lower loaded pallet. The preferred load height H is defined for the purposes of this disclosure as the height of a pallet 18 with load 28 thereon as measured from the pallet base member 22 to the load top surface 38. Also, as discussed more fully below, the present inventive pallet stacker 10 may be adapted to accept loaded pallets of varying preferred load heights H.

Figure 10A:
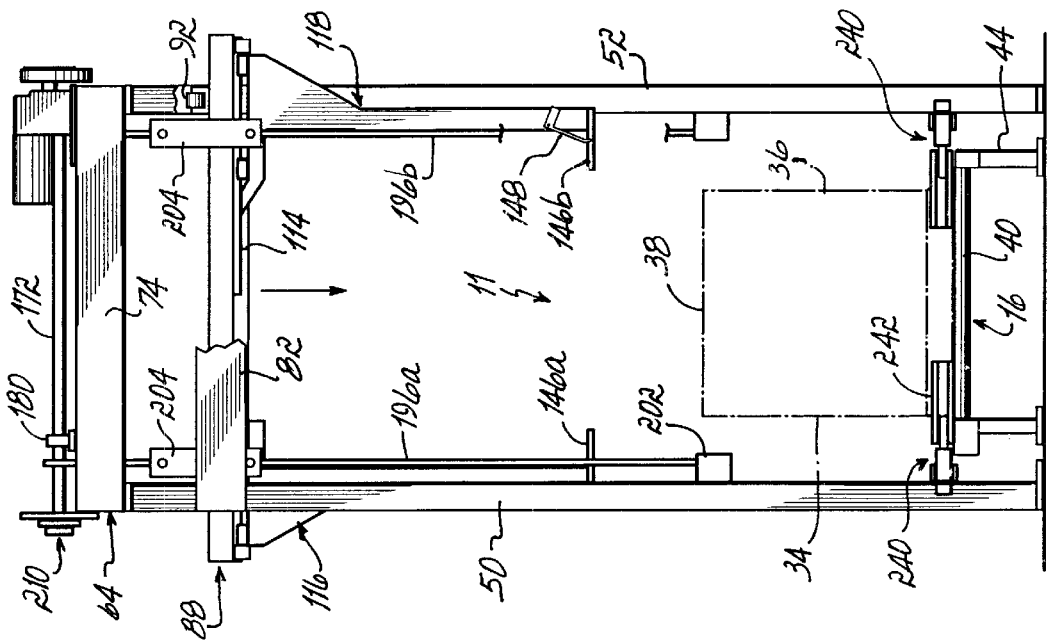
FIG. 10A is a schematic front plan view of the first step shown in FIG. 5A.

The modular pallet stacker 10 straddles an existing conveyor system 16, as seen best in FIGS. 1, 2 and 10A. The conveyor system 16 generally has plural rollers 40 extending between parallel rails 42 supported by legs 44. The modular pallet stacker 10 may be configured to operate with any conventional conveyor system 16 known in the art as long as a sufficient clearance exists above the conveyor system for the pallet stacker. As discussed further below, the pallet stacker 10 is particularly advantageously employed with known belt driven roller conveyor systems. While operation of the pallet stacker 10 preferably is entirely automatically controlled by a programmable logic controller system contained in control box 46 located on safety fence 48, the pallet stacker 10 may be manually operated from the same control box in the event of, for instance, maintenance of the pallet stacker 10.

The pallet stacker 10 has a main support frame 49 with first, second, third and fourth vertical support legs 50, 52, 54, 56 each having a base 58 to be mounted on the floor 13, see FIG. 1. The main support frame 49 also has first and second upper cross machine direction (CMD) members 82, 84 to enhance the structural integrity of the frame 49. The first upper CMD member 82 is attached by any suitable means at a first end 82a to the first leg 50 and at a second end 82b to the second leg 52. The second upper CMD member 84 is attached by any suitable means at a first end 84a to the fourth leg 56 and by any suitable means at a second end (not shown) to the third leg 54. Thus, the main support frame 49 defines a stationary stacking location or work station 11 on the floor 13 between legs 50, 52, 54, 56, and through which the conveyor 16 is directed, in order to provide successively first and second loaded pallets 12, 14 within that work station. A top support frame 64 is secured by any suitable means to the main support frame 49 cross machine direction (MD) members 66, 68. The first MD member 66 is supported at first and second ends 66a, 66b by first and fourth support legs 50, 56, respectively. The second MD member 68 is supported at a second end (not shown) by the third support leg 54 and proximate a first end 68a upon the second support leg 52. The second MD member 68 has a first end portion 70 which extends away from the pallet stacker 10 and has a top surface on which a drive system 72 is supported, as discussed further below. The top support frame 64 also has first and second cross machine direction (CMD) members 74, 76 spanning between and secured by any suitable means to the first and second MD members 66, 68. First and second braces 78, 80 are secured by any suitable means to the first and second MD members 66, 68, as best shown in FIG. 1.

Figure 3:
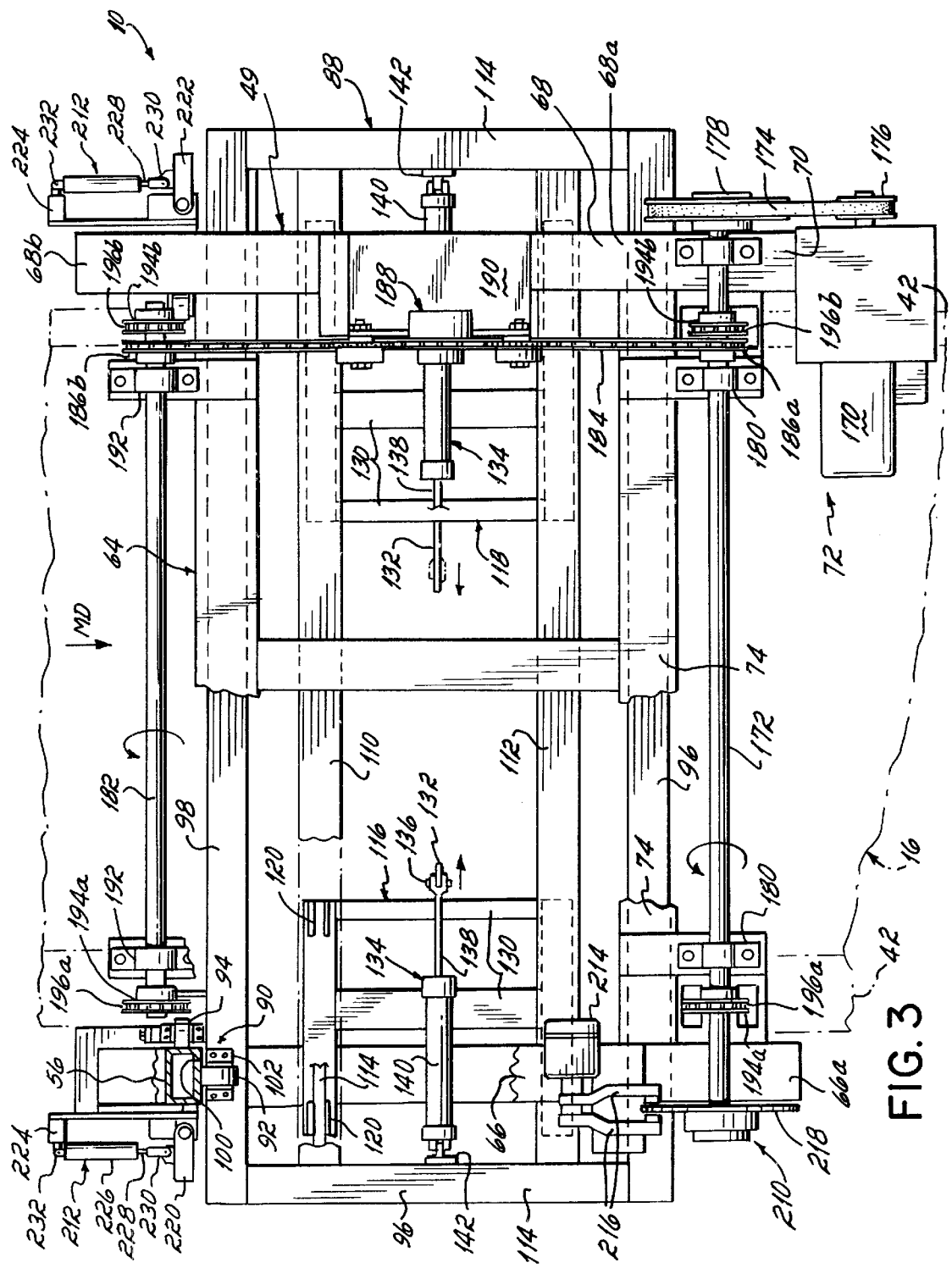
FIG. 3 is a top view of the stacker of FIG. 1.

A pallet carriage 88 has first, second, third and forth roller sets 90 that cooperate with each of the frame's form legs 50, 52, 54, 56, each roller set 90 having first and second rollers 92, 94 mounted on axes perpendicular to each other upon first and second longitudinal beams 96, 98 of the pallet carriage 88, see FIG. 3. In order to facilitate understanding of the present invention, only the fourth roller pair 90 is shown. However, it will be understood that the second, third and fourth roller pairs 90 are similarly provided upon the pallet carriage 88. Each roller set 90 is received against respective first, second, third and forth frame legs 50, 52, 54, 56, to allow the pallet carriage 88 to be vertically adjustable, i.e., to be raised and lowered vertically within the frame 49 and, therefor, within the work station 11.

Figure 5:
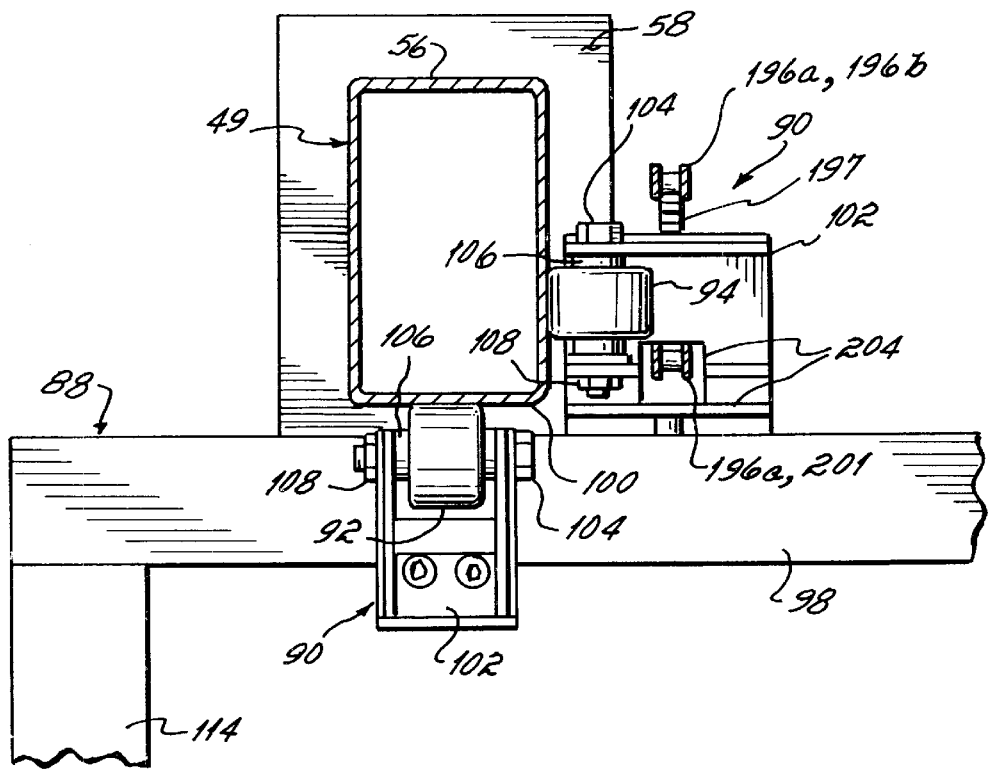
FIG. 5 is a cross-sectional view of FIG. 2 taken along line 5—5.

As seen in FIGS. 3 and 5, the roller pair set 90 defines a vertical guide 100 in which the fourth frame leg 56 is received so that when the pallet carriage 88 is vertically adjusted, the roller pair set 90 travels against the frame leg 56 within the frame. Each roller 92, 94 is mounted to the longitudinal beam 98 by a respective roller bracket 102 and held therein by a bolt 104 journaled through apertures (not shown) in the bracket 102 and bushings 106 interposed between the bracket 102 and the roller 92, 94. The bolt 104 is secured in place by a nut 108 threadedly received thereupon. This same roller 92, 94 structure is mounted on the pallet carriage 88 to cooperate with each of the other three frame legs 50, 52, 54 too.

The pallet carriage 88 includes first and second arm assemblies 116, 118 movably carried on tracks 114 fixed to carriage arm supports 110, 112. As best seen in FIGS. 1, 2 and 3, the first and second arm assemblies 116, 118 ride upon the carriage tracks 114 with bearing blocks 120 journaled thereon so that the arm assemblies 116, 118 may move in the cross machine direction (CMD) indicated by arrow CMD. The first arm assembly 116 has a pair of first and second arms 122a, 122b, see FIGS. 1, 2, 6 and 7, which oppose first and second arms 124a, 124b, see FIG. 1, on the second arm assembly 118, each arm 122a, 124a, 122b, 124b, being affixed to respective first and second arm brackets 126, 128 (FIG. 2). The arms 122a, 122b and arms 124a, 124b of each of the first and second arm assemblies 116, 118, through brackets 126, 128, are each further held in fixed relation to each other with respective transverse members 130 so that when, for example, the first arm assembly 116 moves in the CMD, both of the first arm assembly first and second arms 122a, 122b move in tandem as the first arm assembly's bearing blocks 120 ride upon respective carriage tracks 114.

In order to facilitate movement of the first and second arm assemblies 116, 118 in the CMD relative to the pallet carriage 88, each of the first and second arm assemblies 116, 118 has a link 132 attached approximately medially to respective transverse members 130. Each link 132 couples the respective first and second arm assemblies 116, 118 to respective air actuated piston assemblies 134 which cause the CMD movement of each of the first and second arm assemblies 116, 118. Each piston assembly 134 has a coupling portion 136 to which the respective link 132 is pivotally attached, a cylinder rod 138 which travels in and is actuated by air pressure actuated cylinder 140 pivotally attached to a cylinder bracket 142 coupled to a respective transverse beams 144 of the pallet carriage 88. Each air cylinder 140 is coupled to an air compressor system (not shown) known in the art to facilitate movement of the cylinder rod 138.

Figure 6:
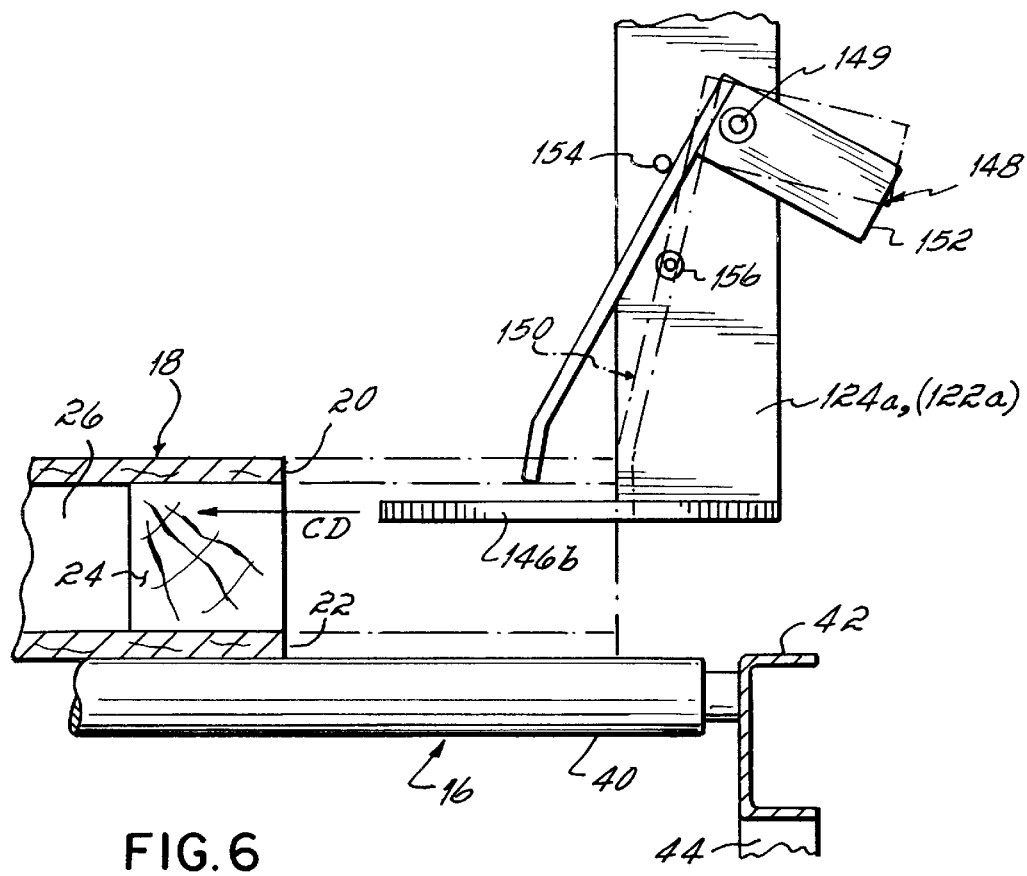
FIG. 6 is a front plan view of a carriage grip switch in accordance with the principles of the present invention.
Figure 10B:
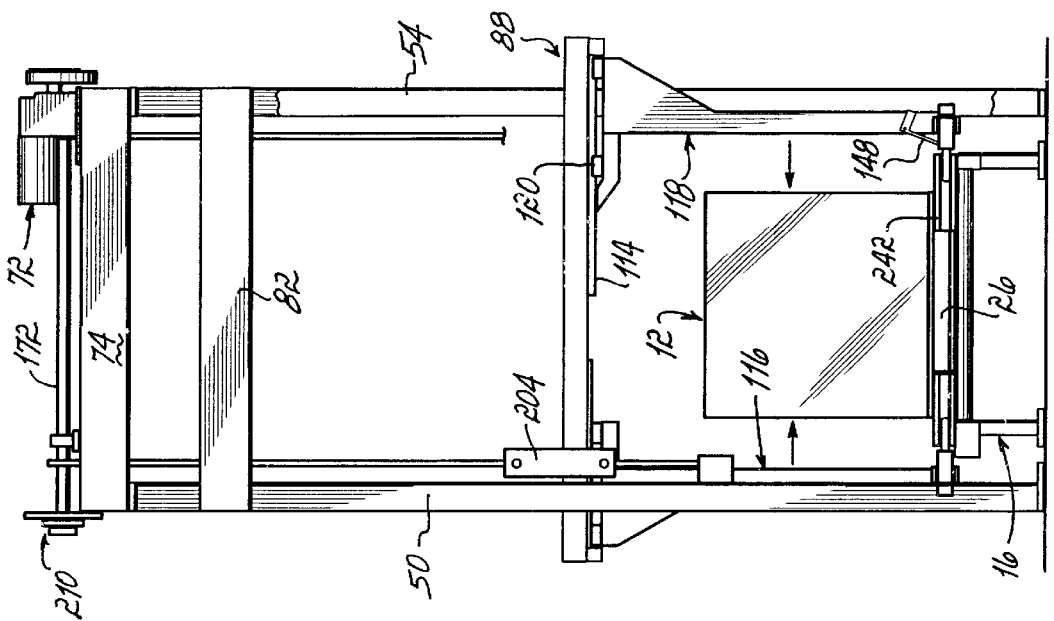
FIG. 10B is a front plan view of the second step shown in FIG. 5B.

Each of the first and second arm assemblies 116, 118 have respective integral feet 146a, 146b at the free or bottom end of each of the first arms 122a, 124a and also integral feet 158a, 158b, at the free or bottom end of each of the second arms 122b, 124b. When the arm assemblies 116, 118 are actuated to engage a first loaded pallet 12 as shown in FIGS. 6, 9B, and 10B, the arms' feet 146a and 146b engage the first loaded pallet 12 within the gap 26 defined between the pallet top member 20 and the pallet base member 22. Each arm assembly's first arm 122a, 124a has a carriage grip completion switch 148, see FIG. 6, proximate the front foot 146a which, when actuated, arrests the CMD movement of the first and second arm assemblies 116, 118 when engaging a first loaded pallet 112. The grip completion switch 148 is pivotally attached as at 149 to the leading arm 122, 124 of each first and second arm assembly 116, 118, and has a lever 150 integral with a counter weight 152 which continually biases the lever 150 inward in the CMD. The lever 150 is limited in its inward movement by a lever stop 154 fixed to the respective first arm 122a, 124a. As first and second arm assemblies 116, 118 are moved inwardly to engage first loaded pallet 12 and each of the front feet 146 enter into engagement with the pallet, resistance from the pallet 18 against the lever 150 arrests that inwardly directed CMD movement of the first and second arm assemblies 116, 118 when the lever actuates a proximity switch 156 fixed to each of the first arms 122a, 124a, thereby signaling the programmable logic controller system 46 to arrest the inward CMD movement of the first and second arm assemblies 116, 118.

Figure 7:
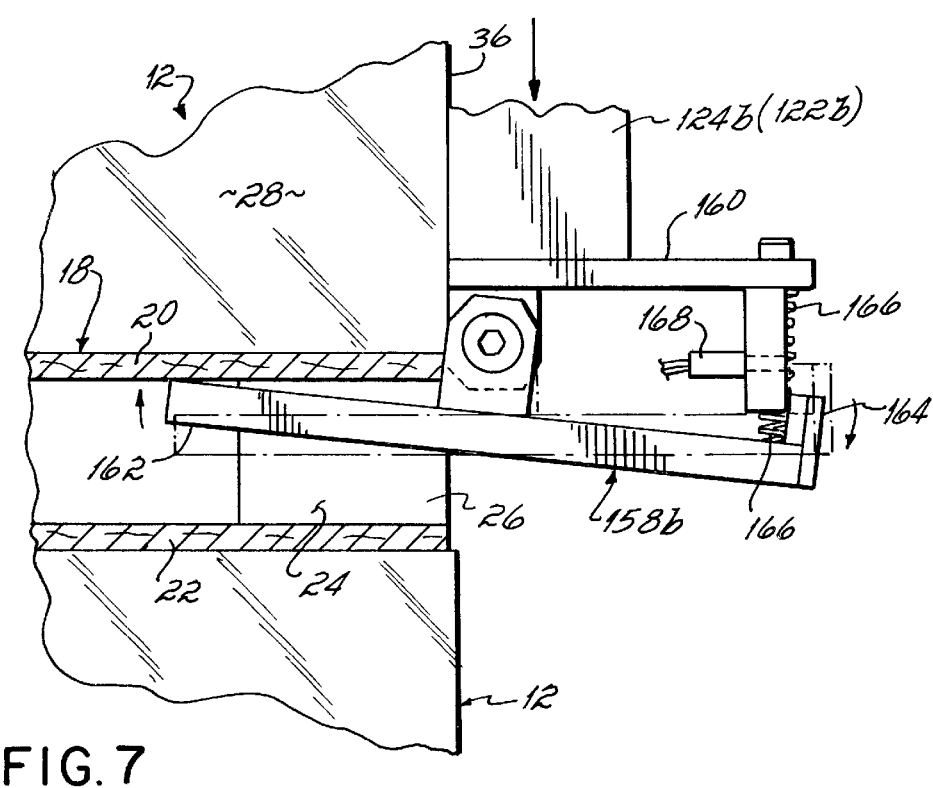
FIG. 7 is a front plan view of a carriage disengagement switch in accordance with the principles of the present invention.

Each of the first and second arm assemblies' second arms 122b, 124b is provided with a carriage disengagement switch 158, as seen in FIGS. 2 and 7. The disengagement switch 158 is pivotally mounted to a switch bracket 160 provided on second arms 122b, 124b. After the feet 146a, 146b, 158a, 158b of the pallet carriage 88 have engaged the first loaded pallet 12, and as the pallet carriage 88 is vertically raised up to lift the first loaded pallet 12, a toe portion 162 of the disengagement switch 158 is biased downward (as shown in FIG. 7 by phantom lines), thereby biasing upward a heel portion 164 which is normally downwardly biased by a compression spring 166 carried between that heel portion and switch bracket 160. As the heel portion 164 of the disengagement switch 158 is biased upwardly, the heel portion 164 is sensed by a disengagement proximity switch 168. After the first loaded pallet 12 has been upwardly vertically adjusted and a second loaded pallet 14 has been located in the stationary work station 11 as shown in FIGS. 9 and 10, the first loaded pallet 12 is vertically lowered downward until it rests on the second loaded pallet 12. The downward movement of the pallet carriage 88 (and, therefor, of the first loaded pallet that it carries) is arrested when, as the pallet carriage 88 continues to move vertically downward, pressure on the toe portion 162 of the disengagement switch 158 is relieved and the compression spring 166 forces the heel portion 164 in a downward direction as shown in FIG. 7, thereby activating the disengagement proximity switch 168 for arresting the downward movement of the pallet carriage 88.

The drive system 72 which operates the upward and downward vertical movement of the pallet carriage 88 is best seen in FIGS. 2 and 3. The drive system 72 includes a geared brake motor 170 which is secured to the top frame member 68 and is linked to a drive shaft 172 with a drive belt 174, thereby coupling a motor pulley 176 to a drive shaft pulley 178. The drive shaft 172 is carried by a pair of journal blocks 180 secured to the top frame member 74. The drive shaft 172 is linked to a lift shaft 182 by a drive chain 184 carried by first and second drive sprockets 186a, 186b. The lift shaft 182 is received through a pair of journal blocks 192 attached to the top frame member 76. An idler mechanism 188 is provided between the first and second drive sprockets 186a, 186b in order to maintain tension on the drive chain 184. The idler mechanism 188 is affixed to the top frame member 66 by an idler bracket 190. The upward and downward adjustment of the pallet carriage 88 is automatically limited by an up limit switch 206 and a down limit switch 208 provided on the main frame leg 50, as seen in FIGS. 1 and 2. As the pallet carriage 88 engages each of the up and down limit switches 206, 208, the pallet stacker's programmable logic controller system 46 shuts off the motor 170 and, thereby, limits upward and downward vertical adjustment of the pallet carriage 88.

The drive shaft 172 and lift shaft 182 are each provided with first and second lift sprockets 194a, 194b which each carry first and second lift chains 196a, 196b, i.e., a lift chain 196a or 196b is provided at each of the four corners of the pallet carriage 88 as that carriage is viewed in FIGS. 1 and 3. With reference to the drive shaft second lift sprocket 194b and second lift chain 196b, for example, the second lift chain 196b around the lift sprocket 194b, and around a return sprocket 197 housed within a sprocket housing 202 attached to the main frame's second support leg 52. The lift chain 196a or 196b is attached at opposing ends 201, 203 to a lift bracket 204 which is attached to the pallet carriage 88. Thus, the lift chain 196b is provided as a continuous loop around the lift sprocket 194b and return sprocket 197 to facilitate vertical movement of the pallet carriage 88 within the frame 49. The two first lift chains 196a and the other second lift chain 196b are similarly mounted relative to the main frame's support legs 50, 54, 56 and the pallet carriage 88.

The pallet stacker 10 also may include a brake system 210 attached to the drive shaft 172, and air actuated safety stops 212 attached to the main frame 49, in order to provide a safe work environment for those in proximity to the pallet stacker 10 and to guard against undesired movement of the pallet carriage 88 due to motor malfunction. As seen in FIG. 3, the brake system 210 includes a brake cylinder 214 attached to the to frame member 66 which drives a pair of brake calipers 216. A brake disc 218 is provided on the drive shaft 172 to enable the brake cylinder 214 to actuate the brake calipers 216 to engage the brake disc 218. Operative engagement of the calipers 216 and brake disc 218 will arrest undesired movement of the drive shaft 172 and, thus, undesired movement of the pallet carriage 88 within the main frame 49. Actuation of the brake system 210 occurs when a proximity switch (not shown) provided on the motor 170 transmission gears (not shown) senses movement of the transmission gears when the motor 170 is not running. The stacker's control system (not shown) assumes there is either a failure in the drive belt 174 connecting the motor 170 to the drive shaft 172 or there is a fault in the braking system (not shown) of the motor 170 itself. In other words, when the drive shaft 172 rotates while the motor 170 is not running, the brake motor 210 will be activated and the brake cylinder 214 will actuate the brake calipers 216 to engage the brake disc 218 and arrest any undesired downward movement of the carriage 88.

The safety stops 212 includes first and second stop blocks 220, 222 attached to main frame support legs 56, 54, respectively, by stop brackets 224. Each first and second stop block 220, 222 is pivotally attached to the bracket 224, and is pivotally movable by a spring loaded air cylinder 226 with piston cylinder rod 228. The cylinder rod 228 is coupled to the stop block 220 by a leading pivot 230 and the air cylinder 226 is coupled to the bracket 224 by a trailing pivot 232. When operating air is dumped from the cylinder 226, the cylinder's spring loading pivotally extends the stop blocks 220, 222 beneath the pallet carriage 88. This allows the pallet carriage 88 to be lowered thereupon so that the automatic pallet stacker 10 can be deactivated in order to allow maintenance.

In accordance with the principles of the present invention, the pallet stacker carries out a unique method for stacking first and second loaded pallets 12, 14, see FIGS. 5–9E. As seen in FIG. 9A, a first loaded pallet 12 is moved by conveyor 16 in the pallet stacker machine direction (MD) as indicated by arrow MD until it is located in the entry position of the stationary work station 11, which entry position is located below the pallet carriage 88 that itself is located at an elevated position. As the first loaded pallet 12 is conveyed to the pallet stacker, a first height sensor 234 senses whether the first loaded pallet 12 complies with the preferred load height H, see FIGS. 8 and 9A. And first and second load sensors 252, 254 determine whether the first loaded pallet 12 complies with the preferred load integrity V, see FIG. 8.

Figure 8:
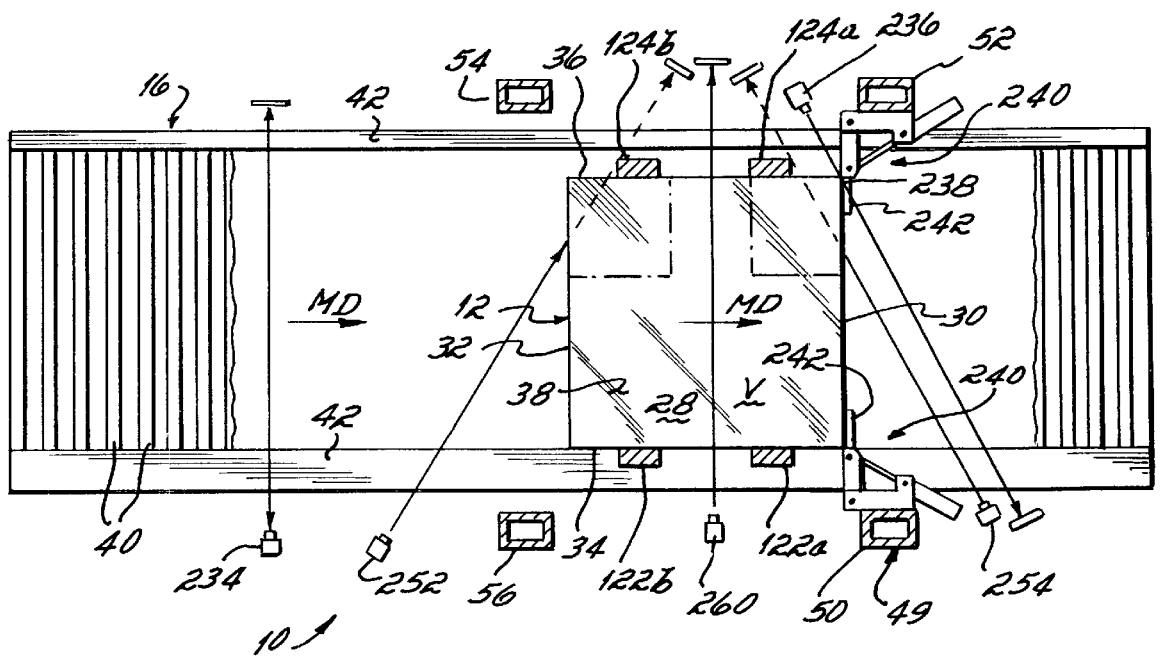
FIG. 8 is a schematic top plan view of the pallet stacker showing height sensors and load sensors.
Figure 9A:
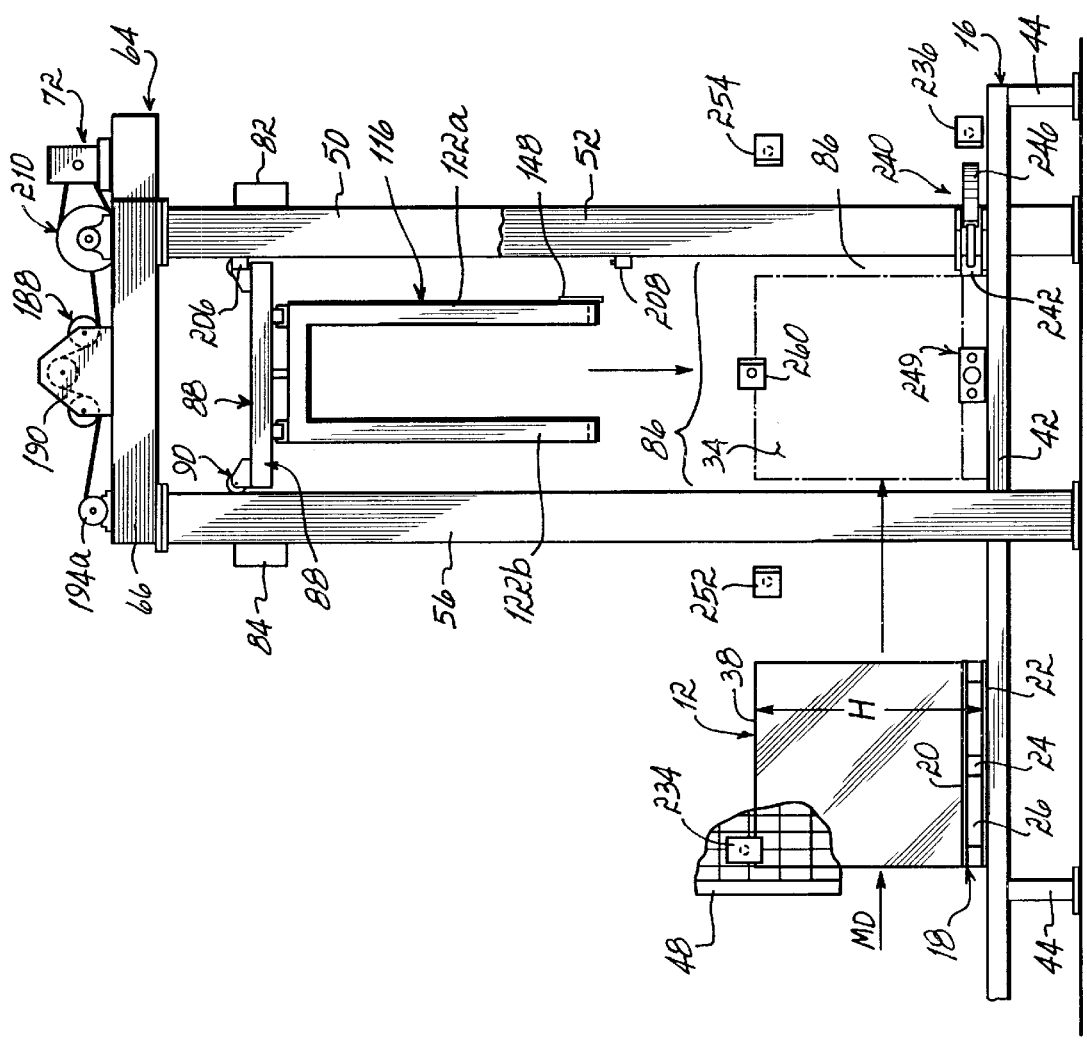
FIG. 9A is a side plan view of a first step in a method of stacking loaded pallets in accordance with the principles of the present invention.
Figure 9B:
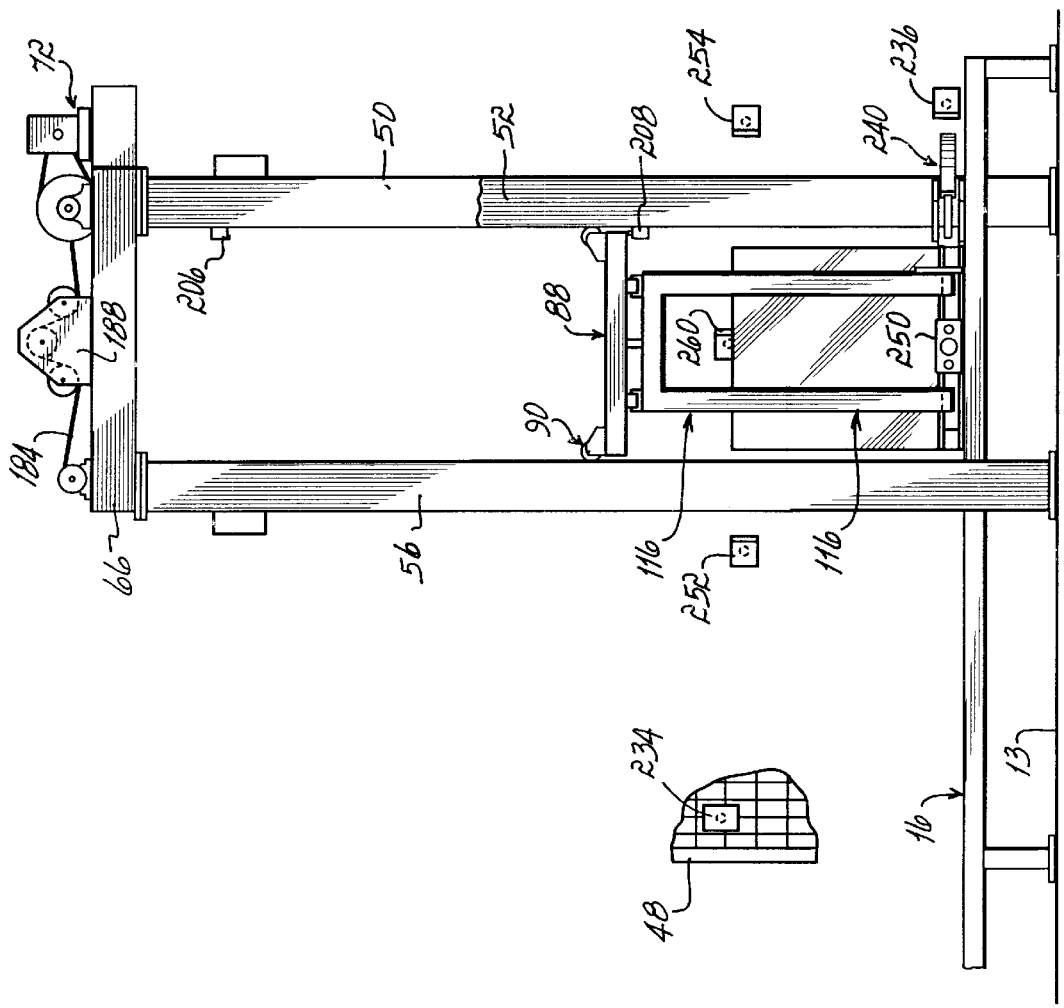
FIG. 9B is a schematic side plan view of a second step in the method.
Figure 10C:
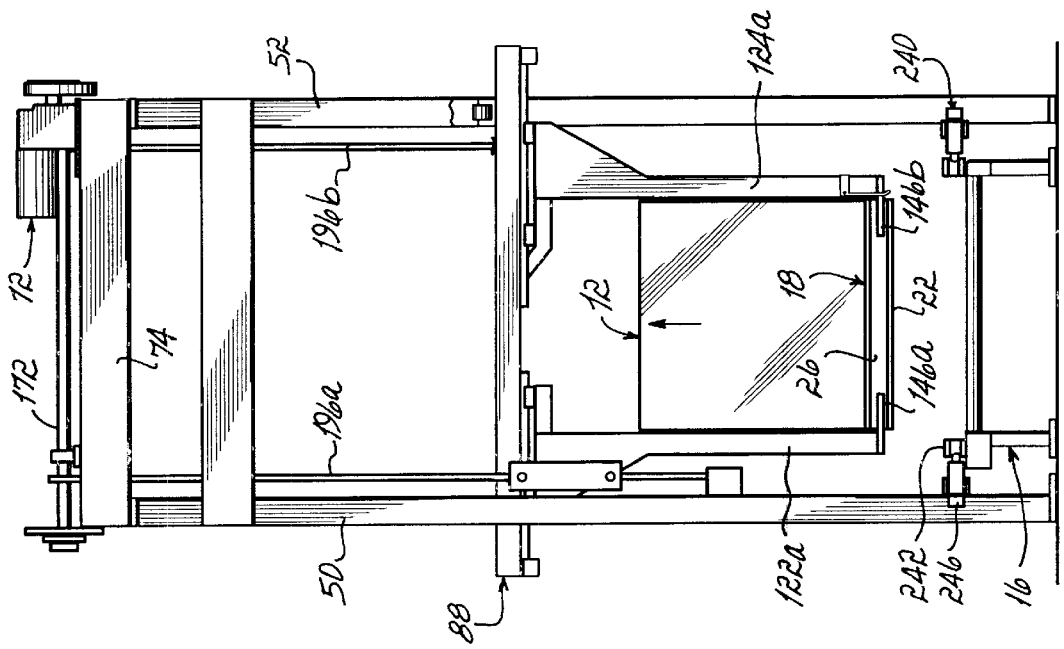
FIG. 10C is a front plan view of the third step shown in FIG. 5C.
Figure 9C:
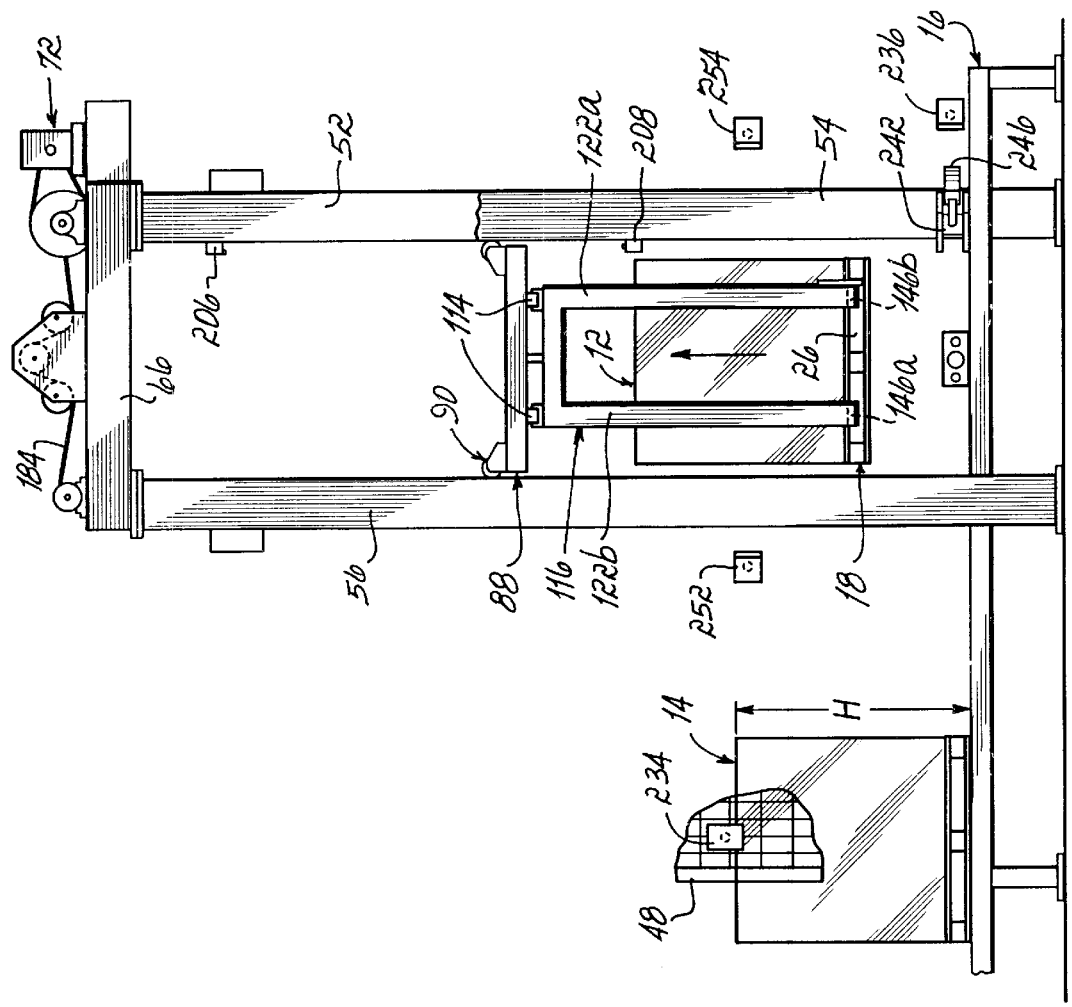
FIG. 9C is a side plan view of a third step in the method.
Figure 10D:
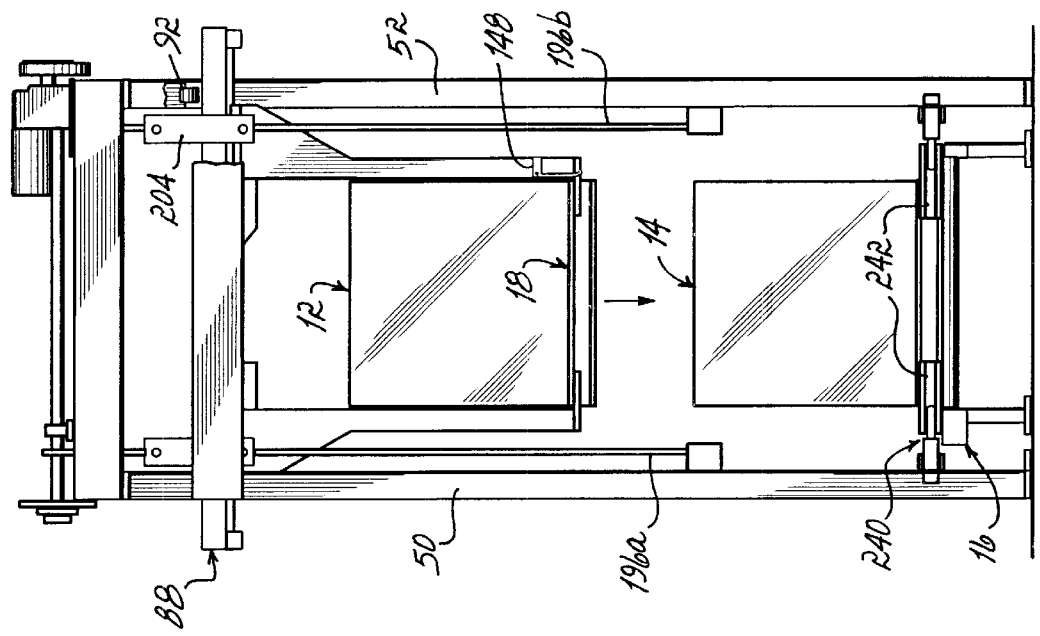
FIG. 10D is a front plan view of the fourth step shown in FIG. 5D.

As the first loaded pallet 12 approaches the work station 11 in the MD, the forward movement of the pallet on the driven conveyor 16 is arrested by pallet stops 240 that engage the first pallet's leading edge 238, see FIG. 8, to locate the first loaded pallet 12 in a positive fashion in the work station 11 where the leading edge is aligned or registered at a preferred MD position in the MD, see FIGS. 9B and 9C. The stop sensor 236 functions to initiate a time delay in the conveyor drive (not shown) after the first loaded pallet 12 enters the work station 11 so that the conveyor continues to push the pallet against the pallet stops 240 to correct any misalignment or cocking of the pallet relative to its MD preferred position in the work station. The pallet stops 240, see FIG. 4, each include a stop arm 242 that is pivotally attached to a bracket 244 which is attached to the main frame legs 50, 52, respectively. While the pallet stop 240 is described herein with reference to the main frame leg 50, it will be understood that a similar pallet stop 240 is attached to main frame leg 52 and has like structure. The stop arm 242 is extended into the CMD by an air actuated cylinder 246 pivotally fixed to the bracket 244. The pallet stop 240 includes a first and a second proximity sensor 248a, 248b which sense extension and retraction, respectively, of the stop arm 242. As the first and second loaded pallets 12, 14 successively engage the stop arm 242, those first and second loaded pallets are thereby aligned and registered in the proper MD entry position of the work station 11.

Figure 4:
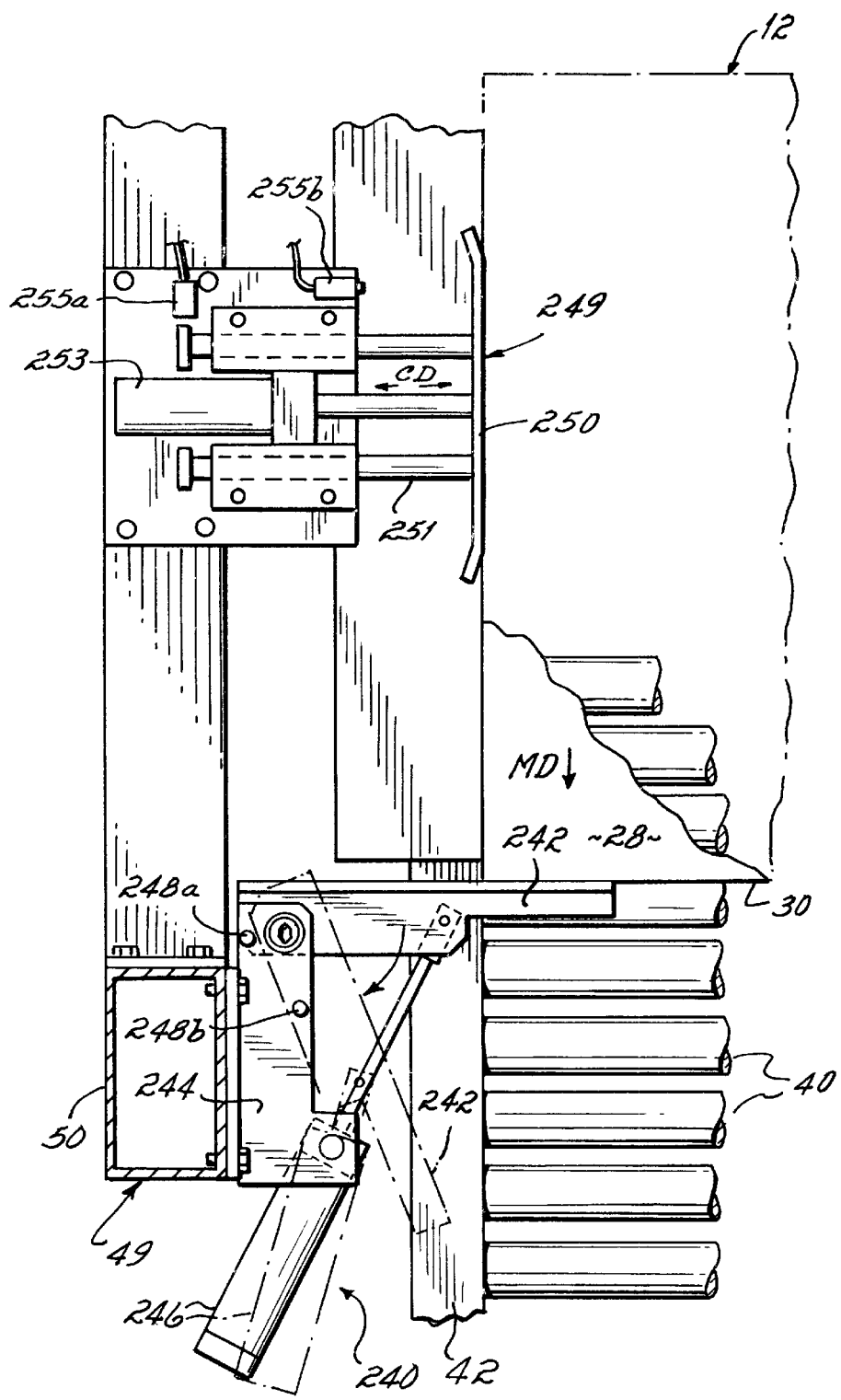
FIG. 4 is a cross-sectional view of FIG. 2 taken along line 4—4.

The first and second loaded pallets 12, 14 are then aligned or registered in the CMD at the work station 11 by a CMD pusher system 249, also see FIG. 4, that may include a pusher plate 250 attached to pusher rods 251 moved by an air pressure cylinder 253 and linked to an air pressure source (not shown). The CMD pusher system 249 has first and second proximity switches 255a, 255b which sense retraction and extension, respectively, of the pusher plate 250.

By using the stop sensor 236, pallet stops 240, and pusher system 249, the pallet stacker 10 may be advantageously used with any conventional conveyor 16. However, the pallet stacker 10 is especially useful with belt driven roller conveyors. In belt driven roller conveyor systems, a belt (not shown) beneath conveyor rollers 40 disengages the rollers 40 when it is desired to stop forward movement of the conveyor 16. The pallet stops 240 arrest the movement of the loaded pallet upon the conveyor 16, which would otherwise be carried by forward momentum through the preferred registration or entry position within the stationary work station 11.

Subsequently, the pallet carriage 88 is moved from the disengaged upper position above the first loaded pallet 12, as indicated by downward arrows in FIGS. 9A and 10A, to a disengaged (disengaged by switch 208) lower position in which the pallet carriage 88 is ready to engage the first loaded pallet 12 as shown in FIGS. 9B and 10B. The first and second pallet carriage arm assemblies 116, 118 are thereafter moved substantially horizontally until the pallet carriage feet 146a, 146b, 158a, 158b engage the first loaded pallet 12 while it is still in the entry position. The horizontal engaging motion of the first and second arm assemblies 116, 118 is arrested as the carriage grip switch 148 senses when the feet 146a, 146b are sufficiently operatively engaged with the first loaded pallet 12 so that the first loaded pallet 12 can be vertically lifted above the entry position as shown by upward arrows in FIGS. 9C and 10C. This results in the first loaded pallet 12 having located in a temporary elevated holding position in the work station that is away from the stationary entry position of the work station 11, see FIGS. 9D and 10D.

Figure 9D:
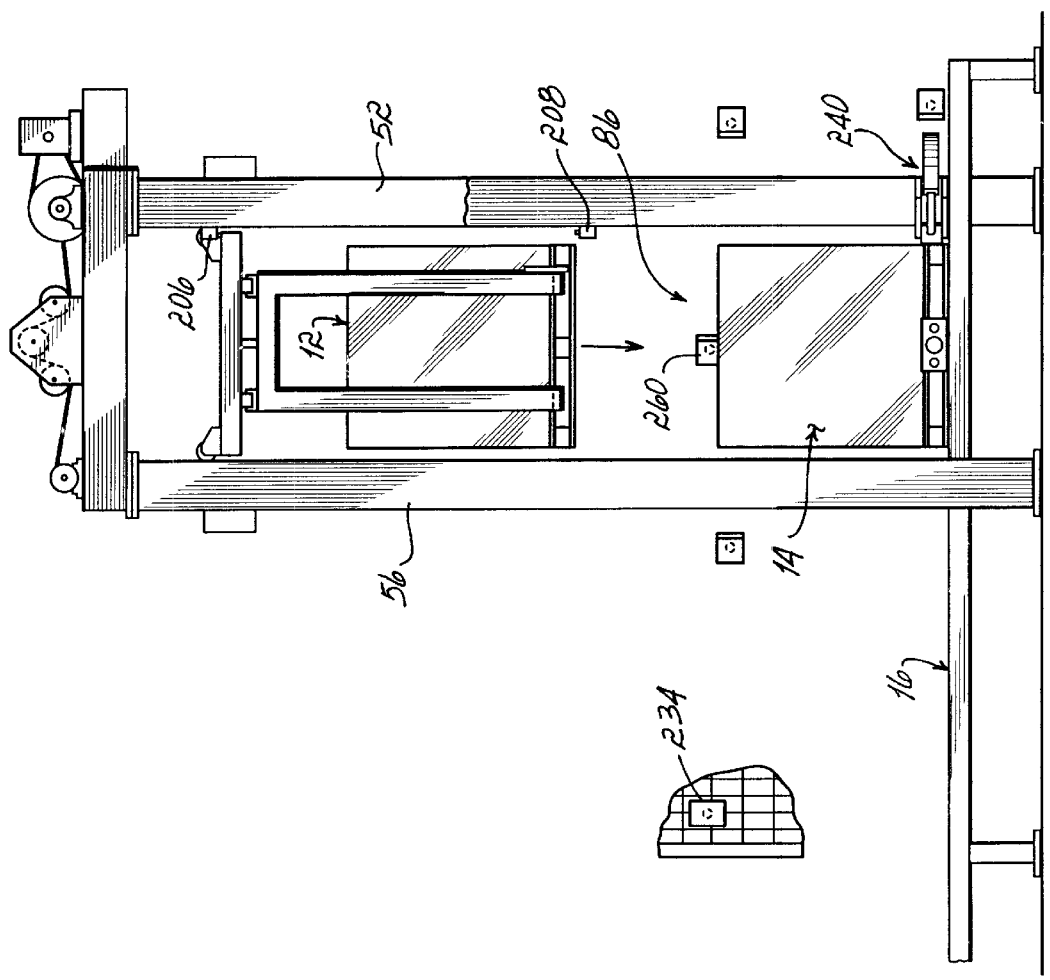
FIG. 9D is a side plan view of a fourth step in the method.

The second loaded pallet 14 is thereafter conveyed on the conveyor 16 to the entry position, also see FIGS. 9C and 9D. The first height sensor 234 senses the preferred load height H of the second loaded pallet 14 as it is conveyed to the stationary stacking location 86. And the first and second load sensors 252, 254 sense the preferred load integrity V of the second loaded pallet 14 to determine whether the first loaded pallet 12 may be stacked in stable relation with the second loaded pallet 14. As the second loaded pallet 14 is received in the stationary stacking location 86, the stop sensor 236 senses the second loaded pallet's leading edge 238, the MD movement of the conveyor 16 is stopped, and the stop arms 240, engage the second pallet's leading edge 238 to arrest that second loaded pallet in the entry position.

Figure 10E:
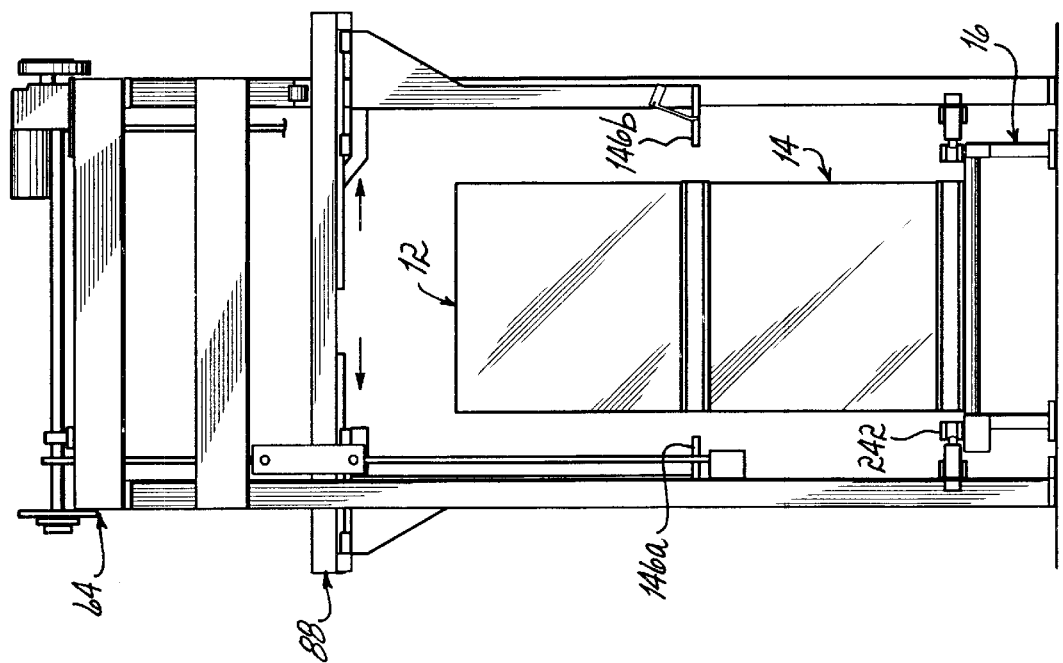
FIG. 10E is a front plan view of the fifth step shown in FIG. 5E. loaded pallets in accordance with the principles of the present invention.
Figure 9E:
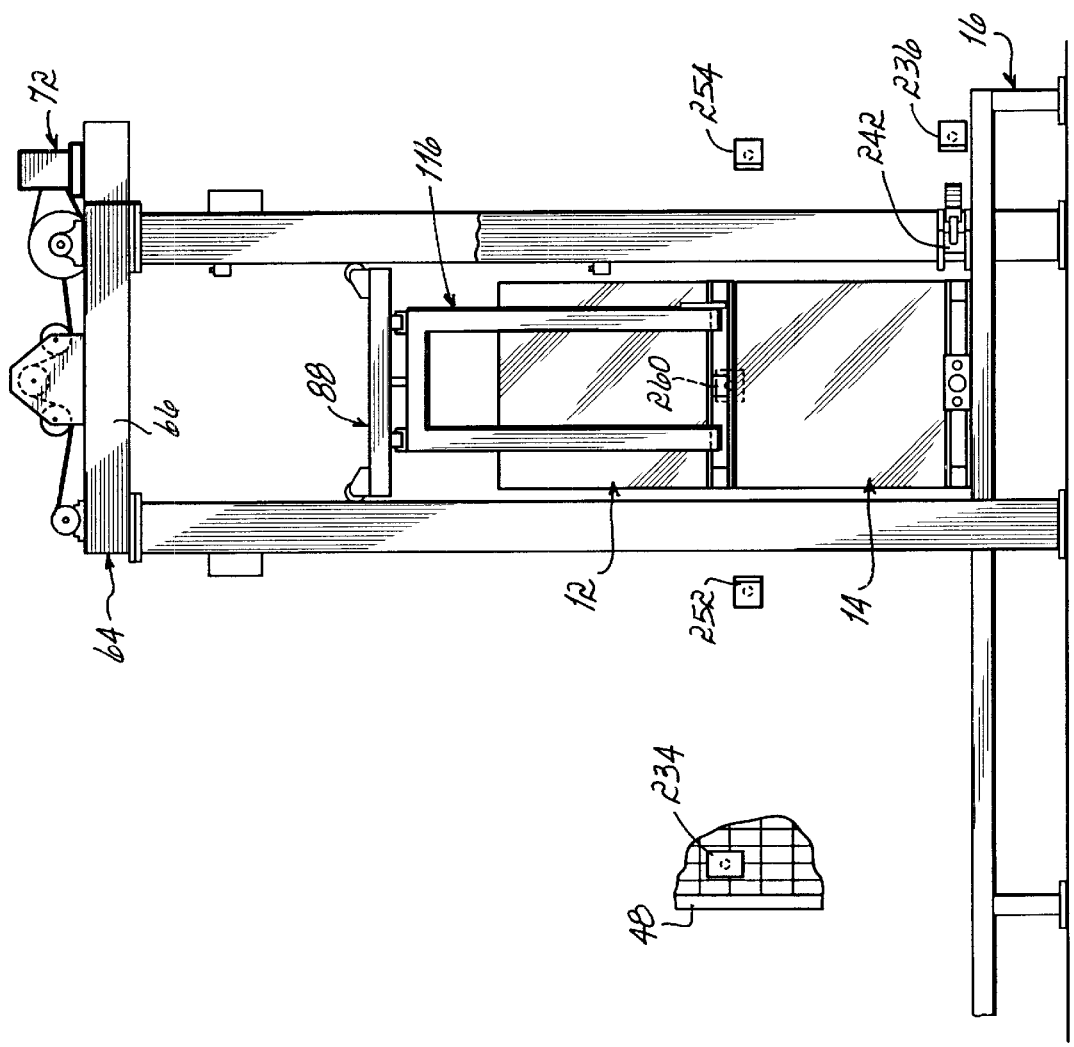
FIG. 9E is a side plan view of a fifth step in the method.

The first loaded pallet 12 is then moved in a reverse or downward vertical direction into stacked relation with the second loaded pallet 14, see FIGS. 9E and 10E. The carriage disengagement switch 158 provided on the pallet carriage 88 senses when the pallet carriage 88 no longer carries the weight of the first loaded pallet 12 after that first pallet is placed in stable stacked relation with the second loaded pallet 14, thereby allowing the pallet carriage 88 to be disengaged from the first loaded pallet 12. The first and second arm assemblies 116, 118 are then horizontally moved outwardly to disengage the pallet carriage 88 from the first loaded pallet 12.

A second height sensor 260 senses when the first loaded pallet 12 has been stacked on top of the second loaded pallet 14 and triggers the stop arms 240 to disengage from the second loaded pallet. This allows the conveyor 16 to transport the now stacked first and second loaded pallets 12, 14 away from the stationary work station 11 of the pallet stacker 10.

From the above disclosure of the detailed description of the present invention and the preceding summary of the preferred embodiment, those skilled in the art will comprehend the various modifications to which the present invention is susceptible. Therefore, I desire to be limited only by the scope of the following claims and equivalents thereof.

We claim:

1. A method for stacking loaded pallets one on top the other, said method comprising the steps of locating a first pallet having a first load in an entry position at a stationary stacking work station, engaging a pallet carriage in operational relation with said first pallet at said entry position of said work station, the height of said carriage and therefore of that first pallet carried thereby, being vertically adjustable, moving said first loaded pallet in a vertical direction relative to said entry position by use of said pallet carriage to a temporary holding position in said work station that is different from said entry position, locating a second pallet having a second load in said entry position of said stationary work station, moving said first loaded pallet in a reverse vertical direction relative to said entry position into a stacked relation with said second loaded pallet in said work station, and sensing the preferred load integrity of that load on which said first loaded pallet will rest prior to moving said first loaded pallet into stacked relation with said second loaded pallet so that first and second loaded pallets will be stacked in stable relation one with the other.

2. A method as set forth in claim 1, said method comprising the step of sensing the preferred load integrity of each of said first and second loads to determine whether both of said loaded pallets are loaded as desired.

3. The method as set forth claim 1, said method comprising the step of orienting said pallet carriage above said stationary stacking location, said first loaded pallet being vertically raised above said entry position, and therefore above said second loaded pallet, during the stacking sequence.

4. The method as set forth in claim 3, said method comprising the steps of:

providing at least two feet on said pallet carriage, said feet being located on opposite sides of said first loaded pallet when said first loaded pallet is in said entry position, and moving both of said feet substantially horizontally for engaging said pallet carriage with said first loaded pallet on opposite sides of that pallet when that pallet is in said entry position.

5. A method as set forth in claim 4, said method comprising the step of sensing when said feet are sufficiently operatively engaged with said first loaded pallet so that pallet can be vertically lifted above said entry position.

6. The method as set forth in claim 1, said method comprising steps of providing at least one foot on said pallet carriage, moving said foot substantially horizontally for engaging said pallet carriage with said first loaded pallet when said first loaded pallet is in said entry position, and moving said foot substantially horizontally for disengaging said pallet carriage with said first loaded pallet when said first loaded pallet has been located in stacked relation with said second loaded pallet.

7. A method as set forth in claim 6, said method comprising the step of sensing when said foot no longer carries the weight of said first loaded pallet after said first loaded pallet has been located in stacked relation with said second loaded pallet, thereby allowing said foot to be disengaged from said first loaded pallet.

8. A method as set forth in claim 1, said method comprising the step of conveying said first loaded pallet on a conveyor to said stationary work station, thereafter conveying said second loaded pallet on said conveyor to said work station, and thereafter conveying said first and second loaded pallets in stacked relation one with the other away from said work station.

9. A method as set forth in claim 8, said method comprising the step of stopping each of said first and second loaded pallets in the machine direction at said entry position in said work station in order to locate each of said pallets at said entry position in said work station.

10. A pallet stacker for stacking loaded pallets one on top of the other, each pallet having a leading edge, a trailing edge, and opposing side, each pallet being adapted to carry a load optimally having a preferred load height and a preferred load integrity, said pallet stacker comprising:

a stationary work station in which a first pallet having a first load may be located;

a pallet carriage in operational engagement with said work station, said carriage being selectively engageable with said first pallet on each of said pallet's opposing side, said carriage and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet; and pusher to engage a side edge of at least one of said first and second pallets for registering each of said first and second loaded pallets at a preferred cross machine direction location within said work station.

11. A method for stacking loaded pallets one on top of the other, said method comprising the steps of:

sensing the height of a first loaded pallet, locating said first loaded pallet at an entry position in a stationary stacking work station, engaging a pallet carriage in operational relation with said first loaded pallet, the vertical location of said carriage and therefore of said loaded pallet carried thereby, being vertically adjustable, said engaging step including providing at least two feet on said pallet carriage, said feet initially being located on opposite sides of said first loaded pallet when said first loaded pallet is in said entry position, and sensing when said feet are sufficiently operatively engaged with said first loaded pallet so that said first loaded pallet can be moved to a temporary holding position that is removed vertically from said entry position, moving said first loaded pallet in a vertical direction within said work station by use of said pallet carriage to a temporary holding position vertically removed from said entry position, locating a second loaded pallet at said entry position in said work station, sensing the preferred load integrity of one of said loaded pallets on which the other of said loaded pallets will rest prior to moving said one loaded pallet into stacked relation with said other loaded pallet so that said loaded pallets will be stacked in stable relation one with the other, moving said first loaded pallet in a reverse vertical direction relative to said entry position into a stacked relation with said second loaded pallet, sensing when said carriage feet no longer carry the weight of said first loaded pallet after said first loaded pallet has been located in stacked relation with said second loaded pallet, thereby allowing said pallet carriage to be disengaged from said first loaded pallet.

12. A pallet stacker for stacking loaded pallets one on top of the other, each pallet having a leading edge, a trailing edge, and opposing sides, each pallet being adapted to carry a load optimally having a preferred load height and a preferred load integrity, said pallet stacker comprising:

a stationary work station in which a first pallet having a first load may be located;

a pallet carriage in operational engagement with said work station, said carriage being selectively engageable with said first pallet on each of said pallet's opposing sides, said carriage and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet; and a stop sensor for locating each of said first and second pallets within said work station, and a stop arm to engage the leading edge of each of said first and second pallets for registering each of said first and second loaded pallets at a preferred machine direction location within said work station.

13. A pallet stacker for stacking loaded pallets one on top of the other, each pallet having a leading edge, a trailing edge, and opposing sides, each pallet being adapted to carry a load optimally having a preferred load height and a preferred load integrity, said pallet stacker comprising:

a stationary work station in which a first pallet having a first load may be located;

a pallet carriage in operational engagement with said work station, said carriage being selectively engageable with said first pallet on each of said pallet's opposing sides, said carriage and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet;

at least two feet connected with said carriage, one of said feet being selectively engageable with one of said first pallet's opposing sides and the other of said feet being selectively engageable with the other of said first pallet's opposing sides; and a carriage disengagement switch in operational assembly with said feet for arresting movement of said pallet carriage after said first loaded pallet has been stacked on top said second loaded pallet.

14. A pallet stacker for stacking loaded pallets one on top of the other, each pallet having a leading edge, a trailing edge, and opposing sides, each pallet being adapted to carry a load optimally having a preferred load height and a preferred load integrity, said pallet stacker comprising:

a stationary work station in which a first pallet having a first load may be located;

a pallet carriage in operational engagement with said work station, said carriage being selectively engageable with said first pallet on each of said pallet's opposing sides, said carriage and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet; and a first height sensor for checking the preferred load height of the first and second loaded pallets.

15. The pallet stacker of claim 14, said carriage comprising:

at least two feet connected with said carriage, one of said feet being selectively engageable with one of said first pallet's opposing sides and the other of said feet being selectively engageable with the other of said first pallet's opposing sides.

16. A pallet stacker for stacking loaded pallets one on top of the other, each pallet having a leading edge, a trailing edge, and opposing sides, each pallet being adapted to carry a load optimally having a preferred load height and a preferred load integrity, said pallet stacker comprising:

a stationary work station in which a first pallet having a first load may be located;

a pallet carriage in operational engagement with said work station, said carriage being selectively engageable with said first pallet on each of said pallet's opposing sides, said carriage and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet; and a load sensor for checking the preferred load integrity of a loaded pallet.

17. A pallet stacker for stacking loaded pallets one on top of the other, each pallet having a leading edge, a trailing edge, and opposing sides, each pallet being adapted to carry a load optimally having a preferred load height and a preferred load integrity, said pallet stacker comprising:

a stationary work station in which a first pallet having a first load may be located;

a pallet carriage in operational engagement with said work station, said carriage being selectively engageable with said first pallet on each of said pallet's opposing sides, said carriage and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet;

at least two feet connected with said carriage, one of said feet being selectively engageable with one of said first pallet's opposing sides and the other of said feet being selectively engageable with the other of said first pallet's opposing sides; and a carriage grip completion switch in operational assembly with said feet for arresting engagement of said pallet carriage with said first loaded pallet after said carriage has been selectively engaged with said first pallet.

18. A pallet stacker for stacking loaded pallets one on top of the other, each pallet having a leading edge, a trailing edge, and opposing sides, each pallet being adapted to carry a load optimally having a preferred load height and preferred load integrity, said pallet stacker comprising:

a stationary work station in which a first pallet having a first load may be located;

a pallet carriage in operational engagement with said work station, said carriage being selectively engageable with said first pallet on each of said pallet's opposing sides, said carriage and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet; and a second height sensor for checking whether said second loaded pallet as stacked on said first pallet should be discharged from said work station.

19. A pallet stacker for stacking loaded pallets one on top of another, each pallet having a leading edge, a trailing edge, and opposing sides, each pallet being adapted to carry a load optimally having a preferred load height and a preferred load integrity, said pallet stacker comprising:

a stationary work station in which a first pallet having a first load may be located;

a pallet carriage in operational engagement with said work station, said carriage being selectively engageable with said first pallet on each of said pallet's opposing sides, said carriage and, therefore, said first pallet when same is selectively engaged therewith, being vertically adjustable within said work station, whereby a second pallet having a second load may be located within said work station beneath said first pallet to receive said first loaded pallet in stacked relation upon said second loaded pallet;

at least one foot connected to said pallet carriage for selective engagement with said first loaded pallet;

a carriage grip completion switch in operational assembly engaged with said foot for arresting engagement of said carriage with said first loaded pallet after said carriage has been selectively engaged with said first pallet;

a carriage disengagement switch in operational assembly with said foot for arresting movement of said pallet carriage after said first loaded pallet has been stacked on top said second loaded pallet;

a load sensor for determining compliance of at least one of said first and second loaded pallets relative to a preferred load integrity;

a first height sensor for determining compliance of at least one of said first and second loaded pallets relative to a preferred load height;

a second height sensor for determining whether said stacked first and second loaded pallets should be discharged from said work station; and a conveyor for moving each of said first and second loaded pallets into said work station.

20. The pallet stacker of claim 19, said stacker comprising:

a stop sensor for sensing the location of each of said first and second pallets within said work station; and a stop arm for registering with said first and second loaded pallets within said work station, and for disengaging from said first and second loaded pallets after same are stacked to allow said stacked pallets to be moved away from said work station.

21. The pallet stacker of claim 20, said stacker comprising:

an open operator connected to said stop arm to cause disengagement of said stop arm with said first and second loaded pallets; and a close operator connected to said stop arm to cause engagement of said stop arm with said first and second loaded pallets.

22. The pallet stacker of claim 19, said stacker comprising a pusher to engage a side edge of at least one of said first and second pallets for registering each of said first and second loaded pallets and a preferred cross machine direction location within said work station.

23. The pallet stacker of claim 19, said stacker comprising:

a carriage down switch in operational assembly with said carriage to arrest downward vertical adjustment of said carriage at a pallet engagement position; and a carriage up switch in operational assembly with said carriage to arrest upward vertical adjustment of said carriage after said first pallet has been engaged.

24. The pallet stacker of claim 19, said stacker comprising:

a carriage disengagement switch in operational assembly with said carriage for arresting said carriage at a lower position where said carriage can be disengaged from a pallet.

25. The pallet stacker of claim 19, said stacker comprising:

a registration arm connected with said work station for registering said first and second pallets at said entry position prior to engagement with said pallet carriage.

26. The pallet stacker of claim 19, said stacker comprising:

a motor for driving vertical adjustment of said pallet carriage; and a brake in operational assembly with said pallet carriage for arresting unintentional downward movement of said pallet carriage.

* * * * *

UNITED STATES PATENT AND TRADEMARK OFFICE
CERTIFICATE OF CORRECTION

PATENT NO. : 6,422,806 B1
DATED : July 23, 2002
INVENTOR(S) : Gary E. Jenkins et al.

It is certified that error appears in the above-identified patent and that said Letters Patent is hereby corrected as shown below:

Column 3,
Line 55, change "FIG. 5A" to -- FIG. 9A --.
Line 57, change "FIG. 5B" to -- FIG. 9B --.
Line 59, change "FIG. 5C" to -- FIG. 9C --.
Line 61, change "FIG. 5D" to -- FIG. 9D --.
Line 63, change "FIG. 5E" to -- FIG. 9E --.
Lines 63-64, delete "loaded pallets in accordance with the principles of the present invention;".

Column 5,
Line 23, change "third and forth" to -- third and fourth --.
Line 25, change "and, therefor, within" to -- and, therefore, within --.

Column 6,
Line 5, change "coupled to a respective transverse beams" to -- coupled to respective transverse beams --.
Line 60, change ""(and, therefor," to -- (and, therefore, --.

Column 7,
Lines 31-32, change "the second lift chain 196b around" to -- the second lift chain 196b is carried around --.
Line 50, change "attached to the to frame member 66" to -- attached to frame member 66 --.

Column 8,
Line 3, change "The safety stops 212 includes first and second" to -- The safety stops 212 include first and second --.

Column 9,
Line 27, change "loaded pallet 12 having located" to -- loaded pallet 12 being located --.
Line 43, change "and stop arms 240, engage" to -- and the stop arms 240 engage --.

Column 10,
Line 2, change "Therefore, I desire" to -- Therefore, we desire --.
Line 34, change "as set forth claim 1," to -- as set forth in claim 1, --.

UNITED STATES PATENT AND TRADEMARK OFFICE
CERTIFICATE OF CORRECTION

PATENT NO. : 6,422,806 B1
DATED : July 23, 2002
INVENTOR(S) : Gary E. Jenkins et al.

It is certified that error appears in the above-identified patent and that said Letters Patent is hereby corrected as shown below:

Column 11,
Line 6, change "comprising the step of" to -- comprising the steps of --.
Line 23, change "and opposing side," to -- and opposing sides, --.
Line 31, change "said pallet's opposing side," to -- said pallet's opposing sides, --.
Line 38, change "pusher to engage a side edge" to -- a pusher to engage a side edge --.

Column 14,
Line 4, change "a preferred load height and preferred load integrity," to -- a preferred load height and a preferred load integrity, --.

Signed and Sealed this

Second Day of March, 2004

JON W. DUDAS
*Acting Director of the United States Patent and Trademark Office*